May 1, 1962 W. C. HALLOW ETAL 3,032,301
PARACHUTE-TYPE AERIAL DELIVERY DEVICE FOR HIGH-SPEED
DROP OF PHOTOGRAPHIC FILM OR THE LIKE
Filed Aug. 2, 1960 6 Sheets-Sheet 1
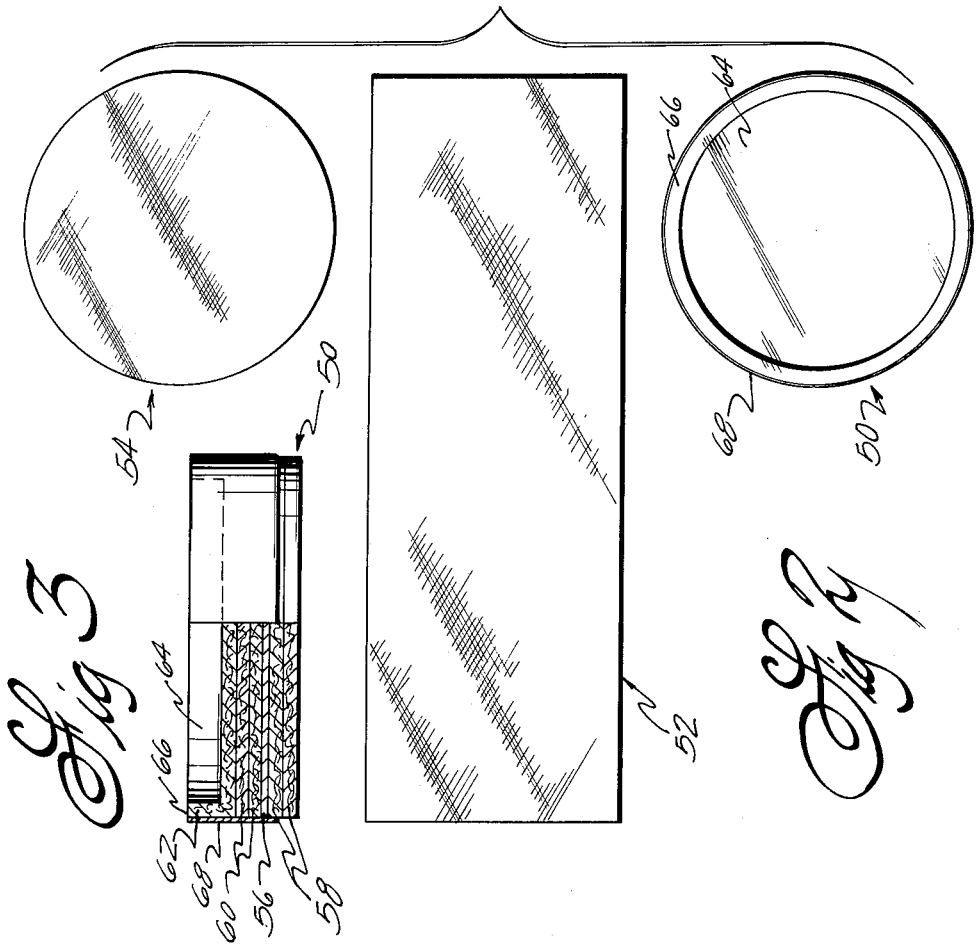
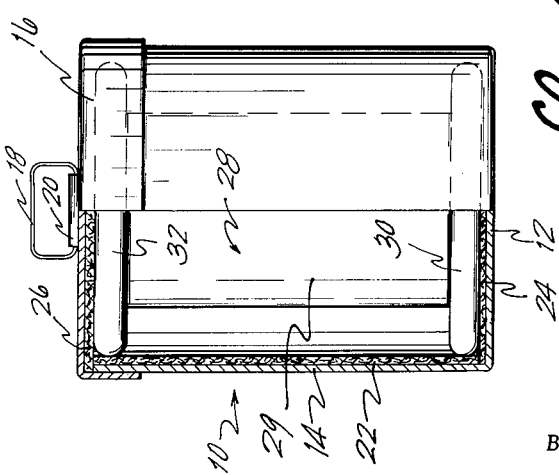
INVENTORS
William C. Hallow
Elmer J. Lion
Joseph Kranc
Irving H. Custis
Frank W. Scutti, Sr.
BY Arthur M. Collins
Robert T. Crawford
Attorneys

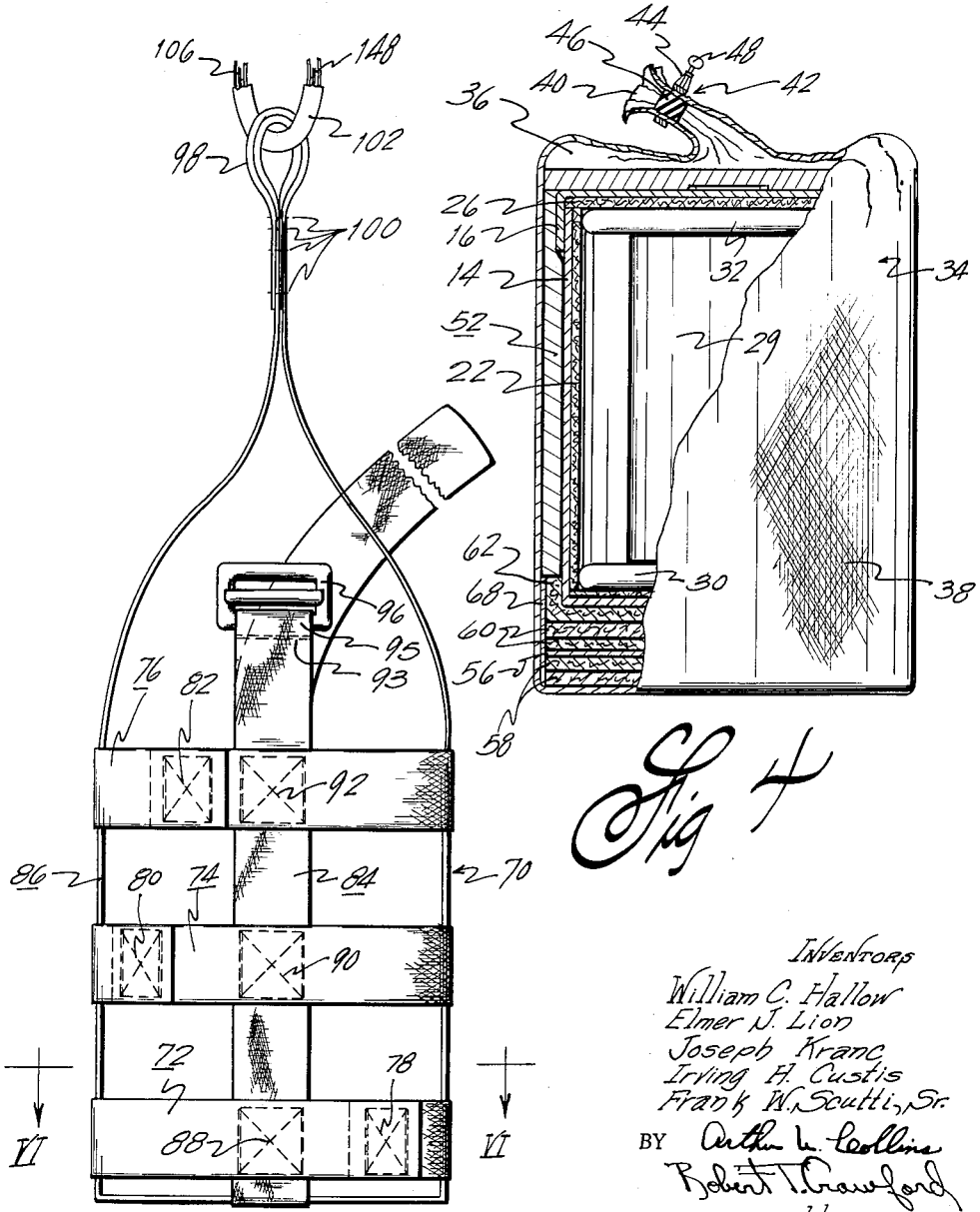

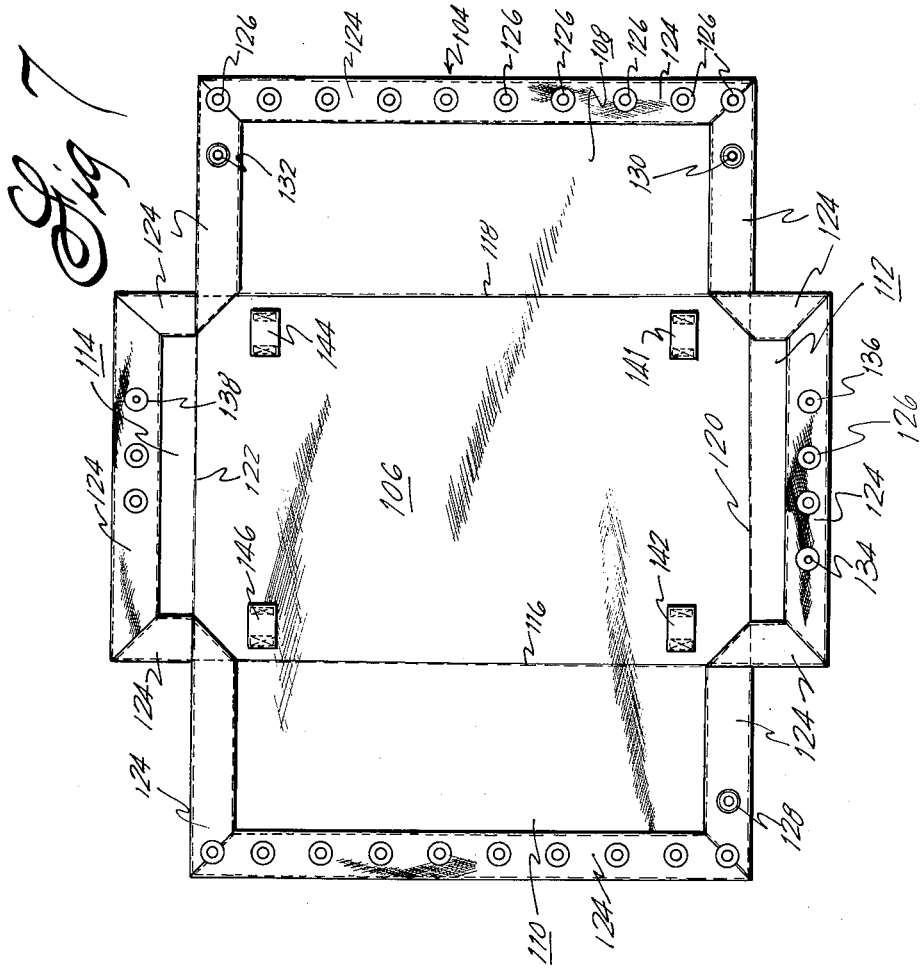
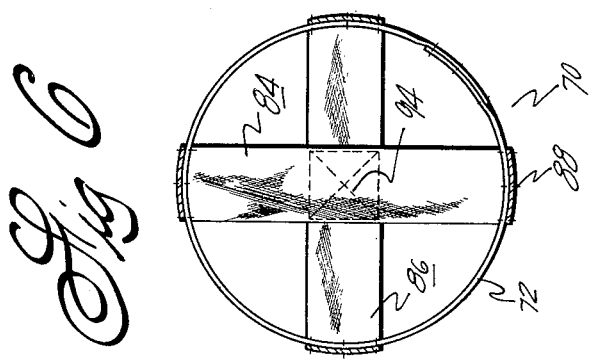

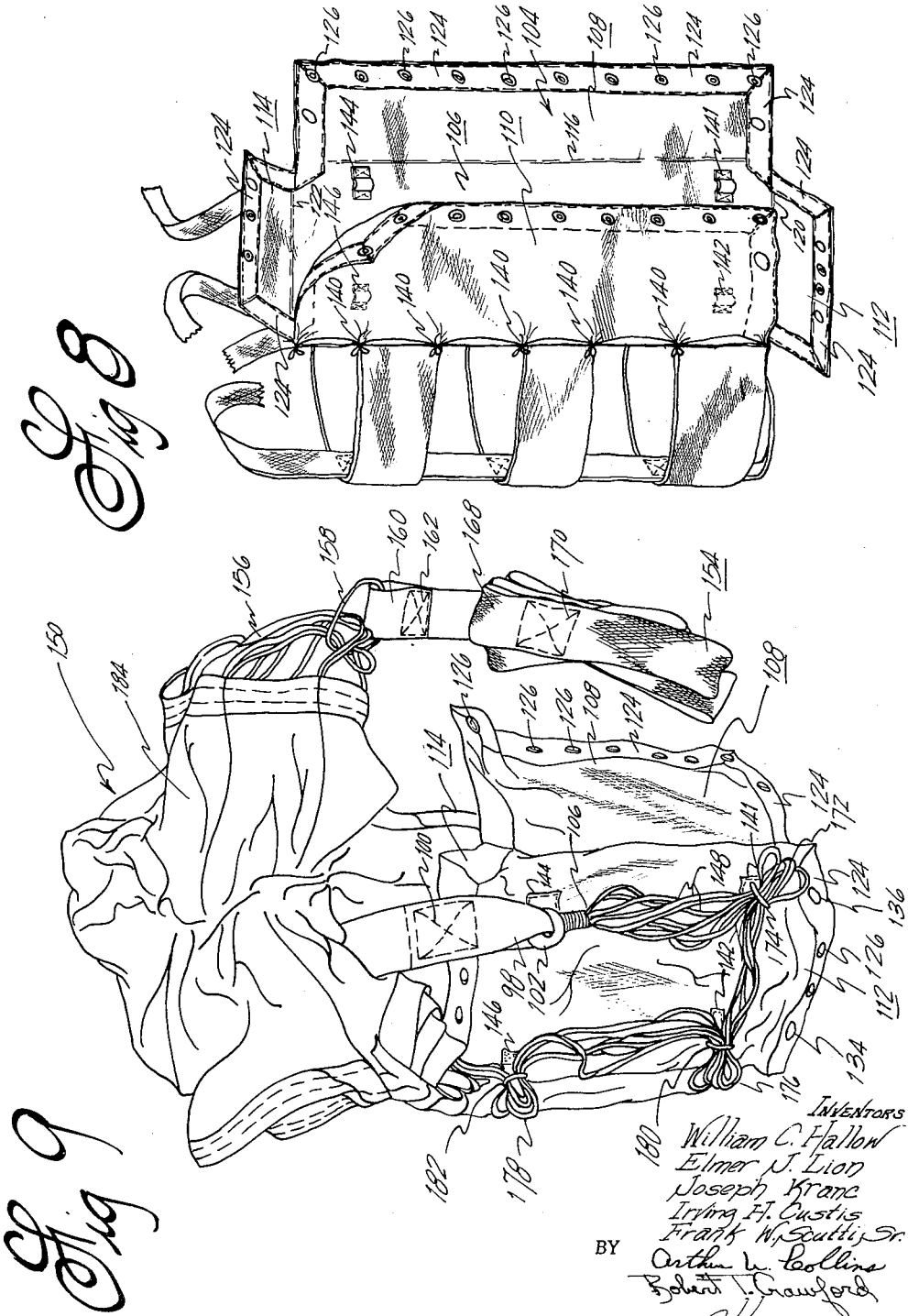

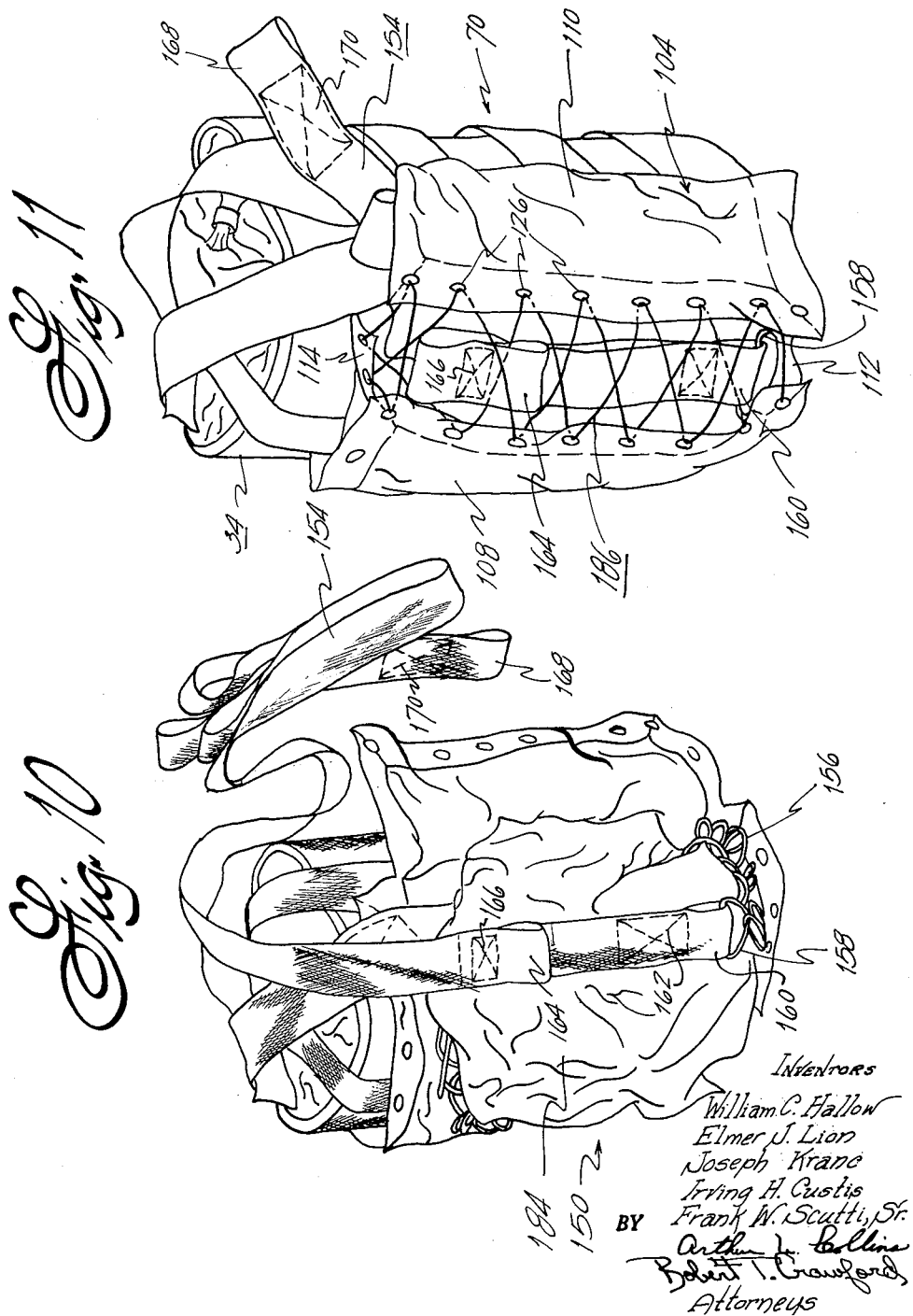

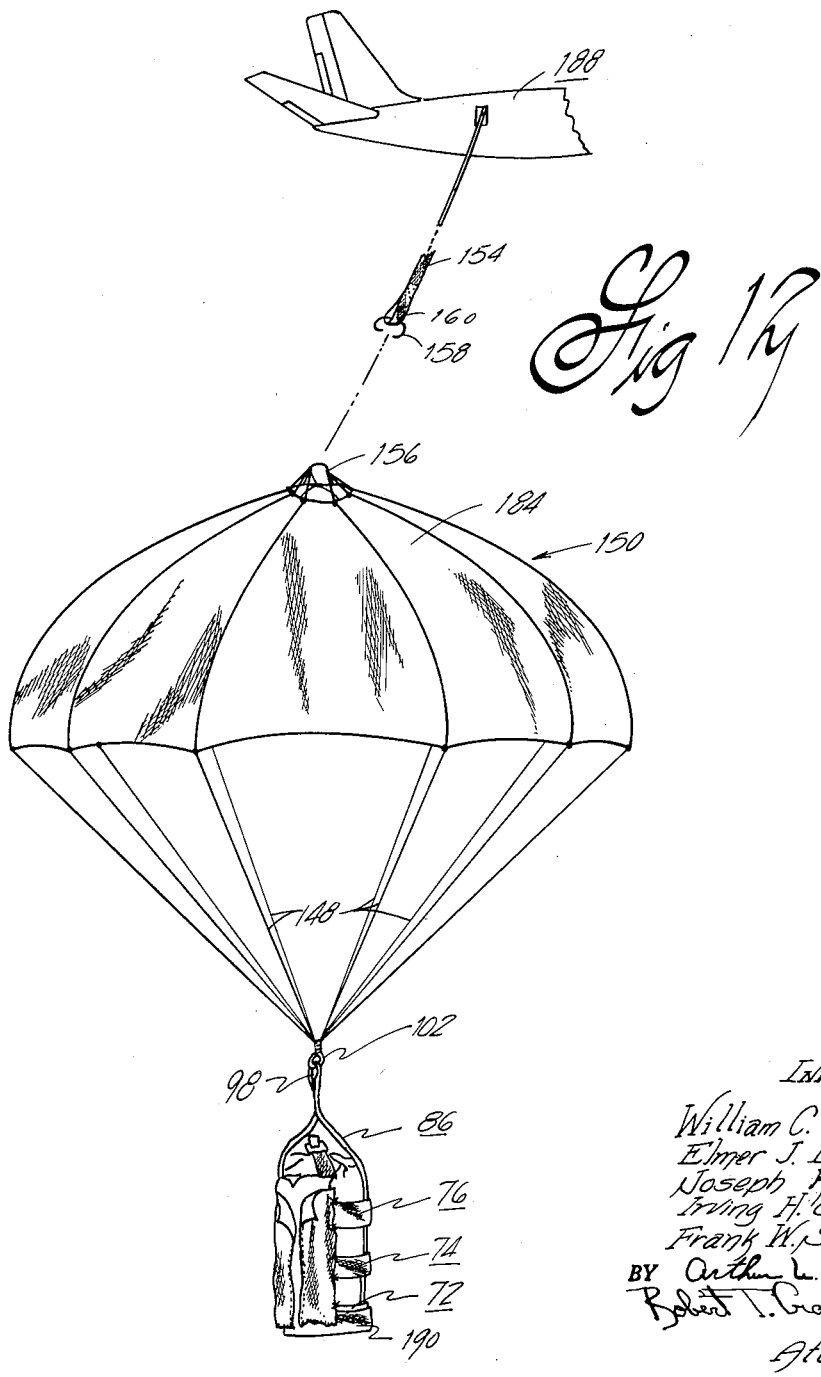

United States Patent Office 3,032,301
Patented May 1, 1962

3,032,301
PARACHUTE-TYPE AERIAL DELIVERY DEVICE FOR HIGH-SPEED DROP OF PHOTOGRAPHIC FILM OR THE LIKE
William C. Hallow, Camden, N.J., Elmer J. Lion, Philadelphia, Pa., Joseph Kranc, Audubon, N.J., Irving H. Custis, Philadelphia, Pa., and Frank W. Scutti, Sr., West Berlin, N.J., assignors to the United States of America as represented by the Secretary of the Navy
Filed Aug. 2, 1960, Ser. No. 47,126
4 Claims. (Cl. 244—138)
(Granted under Title 35, U.S. Code (1952), sec. 266)

The invention described herein may be manufactured and used by or for the Government of the United States of America for governmental purposes without the payment of any royalties thereon or therefor.

This invention relates to aerial delivery devices and more particularly to parachute-type aerial delivery devices for effecting the safe delivery of frangible or destructible articles from an aircraft to the ground.

One object of the invention is to prevent damage to a frangible or destructible article due to shock or impact loading when dropped from an aircraft to the ground.

Another object of the invention is to prevent water or moisture-damage to an article dropped from an aircraft to the ground.

Another object of the invention is to provide an aerial delivery device which can be easily and quickly assembled and disassembled.

Another object of the invention is to provide an aerial delivery device which can be folded or assembled so as to require a minimum of storage space.

In conformity with these objects, the present invention is characterized by a parachute in combination with a moisture-proof and a shock-resisting container or receptacle. The container preferably assumes the form of a can or the like which is enclosed within a moisture-proof bag or sack and is surrounded by a plurality of shock absorbing elements. Before being dropped from an aircraft, the parachute and container together with its frangible contents are assembled as a unit through the medium of a parachute pack and harness. After being dropped from an aircraft, the parachute is immediately withdrawn from the pack of the unit assembly and assumes the "open" or unfolded position to thus slow the descent rate of the container. When the container strikes the ground, damage to the container as well as its contents will be prevented by the shock absorbing elements as well as the parachute pack and harness. Once upon the ground, the container can be quickly and easily removed from the pack and harness to provide ready access to the contents thereof.

The aforementioned and other objects of the present invention will become readily apparent to those skilled in the art from the following detailed description of one specific embodiment thereof taken in connection with the accompanying drawings, wherein:

FIG. 1 is a partial longitudinal section through the container with part of the container and its contents being shown in side elevation;

FIG. 2 is a bracketed top plan view of the shock absorbing elements;

FIG. 3 is a partial longitudinal section through one of the shock absorbing elements;

FIG. 4 is a cutaway longitudinal section through the moisture-proof and shock-resisting container showing the container confined within the sack and surrounded by the shock absorbing elements;

FIG. 5 is a side elevation of the harness;

FIG. 6 is a section taken along the line VI—VI in FIG. 5 viewed in the direction of the arrows;

FIG. 7 is a plan view of the parachute pack in the "open" or unfolded position;

FIG. 8 is a perspective view of the pack and harness showing the pack attached to the harness;

FIG. 9 is a perspective view illustrating one step in the placement of the parachute within the pack;

FIG. 10 is a perspective view illustrating another step of the placement of the parachute within the pack;

FIG. 11 is a perspective view illustrating the aerial delivery device in complete unit assembly just prior to being dropped from an aircraft; and FIG. 12 is a perspective view of the aerial delivery device just after being dropped from an aircraft with the parachute thereof in the "open" position.

Referring more particularly to the drawings wherein like reference numerals are employed to designate like components throughout the several figures, the aerial delivery device is shown in FIG. 1 as being comprised of a receptacle or container 10 which in this specific embodiment of the invention takes the form of a substantially cylindrical can. The can 10 includes a bottom wall or a bottom 12, a sidewall 14 and a removable lid or cover 16, the cover 16 having a bail or handle 18 pivotally attached thereto by a strap member or the like 20 to assist in the removal thereof. The strap member 20 is rigidly connected to the lid 16 by any suitable means (not shown), and the handle 18, while shown in the upstanding position, may nevertheless be rotated downwardly into a "flat" or reclining position on the outer peripheral surface of the lid 16.

The inner peripheral surfaces of the can 10 each carry a lining made of a compressible material, and the linings in this specific embodiment of the invention assume the form of a cylindrical liner 22 carried on sidewall 14 and a pair of annular discs 24 and 26 carried on the bottom wall 12 and lid 16, respectively. The linings 22, 24 and 26 in this instance are preferably made of cardboard and are preferably secured to the inner peripheral surfaces of the can by a suitable adhesive (not shown). Can 10 is adapted to house a frangible or destructible article and, in this specific illustration of the invention, the frangible or destructible article assumes the form of a roll of photographic film 28. The roll of film 28 is carried on a spool 29 and the spool 29 is dimensioned such that the cylindrical ends 30 and 32 thereof are snugly received within the interior of the can 10 or more particularly are snugly engaged by the linings 22, 24 and 26.

To protect the contents of the can 10 from the damaging effects of moisture and water, means is provided to prevent the admission of moisture and water into the can. To this end, referring now to FIG. 4, the can 10 together with the shock absorbing elements surrounding same, the shock absorbing elements to be described in detail hereinafter, are carried or received within a sealed and flexible-walled envelope or receptacle which in this specific embodiment of the invention takes the form of a moisture and water-proof sack or bag 34. Bag 34 is preferably made of polyethylene, a heat sealable plastic, although it will be appreciated that any other water and moisture-repellant plastic such as vinyl or, for that matter, any other moisture and water repellant material could be successfully employed. Bag 34 in this instance is comprised of a laminate of aluminum foil 36 sandwiched between layers of polyethylene and backed or covered with a scrim material 38 (loosely woven cotton fibres) to add to the strength and rigidity of the bag. Bag 34 is preferably made from a laminate comprised of sheet aluminum foil sandwiched between sheet polyethylene and sheetscrim material. To fabricate the bag 34, a sheet of this laminate is first folded in half and two edges of the folded sheet are then heat sealed with a hot iron or the like to thereby yield the finished bag. This particular method of making the bag 34 wherein a heat sealable plastic sheet is employed as the principal constituent has been found to be most practicable in that it provides a quick and inexpensive method of making a bag of any desired size.

The "open" end 40 of the bag 34, the upper end as seen in FIG. 4, is provided with a sealing means or seal, and, in this specific instance, the seal takes the form of a conventional hose clamp 44 in combination with a rubber plug 46. To seal the "open" end 40 of the bag, the upper portion of the bag is first crimped or reduced in diameter and the rubber plug 46 is then inserted by hand into the reduced diameter opening so produced. The hose clamp 44 is then applied to that segment of the bag surrounding the plug 46 following which the screw 48 of the hose clamp 42 is tightened to thereby rigidly connect the bag and plug and thus tightly seal the upper or "open" end of the bag.

Referring now to FIGS. 2, 3 and 4, the can 10 when enveloped by bag 34 is adapted to be surrounded by shock absorbing means or a plurality of shock absorbing elements, the shock absorbing elements in this specific embodiment of the invention being three in number and taking the form of a bottom shock absorbing element 50 for protecting the bottom 12 of the can, a side shock absorbing element 52 for protecting the sidewall 14 of the can and a top shock absorbing element 54 for protecting the lid 16 of the can. Bottom shock absorbing element 50 in this specific instance is comprised of a laminate including a metal disc 56 (FIGS. 2 and 4), preferably made of aluminum, sandwiched between pairs of discs 58—58 and 60—60, the pairs of discs 58—58 and 60—60 of necessity being made of a good shock absorbing material which good shock absorbing material in this specific illustration of this invention assumes the form of a commercially available material or product commonly identified by the trademark "Celotex." Shock absorbing discs made of "Celotex" have been found to possess a great capacity for absorbing shock or withstanding impact loads, although it will be apparent to those skilled in the art that shock absorbing discs made of any other material possessing similar shock absorbing properties could also be successfully employed.

The laminated shock absorbing element 50 also includes another shock absorbing disc 62 which is carried by and engages one of the discs 60. Disc 62 is also made of "Celotex" in this particular instance and is provided with an enlarged annular recess 64 therein which defines an annular flange 66 thereon. Recess 64 has a predetermined diameter and more particularly is dimensioned such that in assembly with can 10 it will snugly receive the bottom of the can (FIG. 4). The metal disc 56 and the plurality of "Celotex" discs comprising the laminated shock absorbing element 50 are held in unit assembly by any suitable means (not shown), preferably an adhesive, and, in this specific embodiment of the invention, the outer periphery of the laminate is covered with a filament tape or the like 68 to prevent radial deformation of the annular flange 66.

The side shock absorbing element 52 in this specific embodiment of the invention assumes the form of a substantially rectangular-shaped piece of felt having a length and a width sufficient to completely enclose the sidewall of the can 10 when wrapped around the can as shown in FIG. 4. Similarly, the top shock absorbing element 54 in this specific illustration of the invention assumes the form of a disc which is also made of felt and has a diameter sufficient to completely cover the lid 16 of can 10, as is likewise shown in FIG. 4.

In placing the components within bag 34 to produce the unit assembly shown in FIG. 4, the bottom shock absorbing element 50 is first placed in the bottom of the bag. The substantially rectangular-shaped shock absorbing element 52 is then rolled into a loose roll and inserted into the bag 34 with the bottom end of the loose roll resting on top of flange 66 on the bottom shock absorbing element 50. The can 10 with the film 28 therein is then inserted into the bag 34 with the bottom of the can being received and snugly seated within bottom shock absorbing element recess 64. Felt disc 54 is then inserted into the bag 34 and placed on the can lid 16. The "open" end 40 of the bag 34 is then reduced in diameter followed by the insertion of the plug 46 therein. Clamp 42 is then applied to the bag 34 and plug 46 and tightly screwed into clamping position to tightly seal the "open" end of the bag.

As best seen in FIGS. 5 and 6, the aerial delivery device also includes a harness means or harness 70 for holding or containing the unit assembly of the can 10, the shock absorbing elements 50, 52 and 54 and the bag 34 and for connecting this unit assembly to a parachute. The harness 70 in this particular illustration of the invention is made of nylon and is comprised of three circular strap members 72, 74 and 76, all of which are substantially axially aligned and each of which is made from an elongated substantially rectangular-shaped nylon strap, the ends of which are overlapped and stitched together, the stitches for connecting the respective straps being designated by the reference numerals 78, 80 and 82. The substantially circular strap members or straps 72, 74 and 76 are spaced a predetermined distance apart and are held in assembly and alignment by a pair of strap members or straps 84 and 86 which are connected to each of the circular strap members and extend substantially longitudinally thereof. Strap members 84 and 86 are each connected to each of circular strap members 72, 74 and 76 at substantially diametrically opposed points and, in this particular instance, all of the strap members are connected by stitching, the stitches connecting strap member 84 at one of the diametrically opposed points to circular strap members 72, 74 and 76 being shown in FIG. 5 and being designated therein by the reference numerals 88, 90 and 92, respectively. Intermediate the ends thereof, strap members 84 and 86 both extend substantially diametrically of circular strap member 72 and thus "cross" each other at substantially right angles (FIG. 6) to thereby provide a bottom in harness 70. At the point of crossing or juncture, the two strap members 84 and 86 are connected by stitches 94.

On one end, strap member 84 is folded backwardly and transversely stitched at 93 to provide a loop or loop member 95 on one end thereof which in this specific embodiment of the invention carries a buckle or buckle member 96. The opposite end of strap member 84 is adapted to be threaded or received within the buckle 96 for a purpose to be discussed in detail hereinafter. The ends of the strap member 86, on the other hand, are rigidly connected and in this specific instance carry or have attached thereto a loop member or loop 98, the loop member 98 and the ends of the strap member 86 all being interconnected by stitches 100. Loop member 98 is adapted to receive another loop member or loop 102 (shown cutaway in FIG. 5) on the bottom ends of the shroud or rigging lines of a parachute, and the loop member 98 in function thus serves as a means to establish a connection between the harness 70 and a parachute, this connection between the harness 70 and a parachute also to be discussed more in detail hereinafter.

Referring now to FIGS. 7 and 8, the aerial delivery device also includes a pack means or pack 104 which is connected to the harness 70 and is adapted to receive or carry a parachute. The pack 104 in this specific instance is made of nylon and, as can best be seen in FIG. 7, is comprised of a central portion or central panel 106 to which are connected pairs of side flaps 108 and 110 and pairs of end flaps 112 and 114. The side flaps 108 and 110 and the end flaps 112 and 114 are connected to the central panel 106 by stitches with the seams between the central panel 106 and the side flaps 108 and 110 being designated by reference numerals 116 and 118, respectively, and the seams between the central panel 106 and the end flaps 112 and 114 correspondingly being designated by the reference numerals 120 and 122, respectively.

The marginal portions of both the side and end flaps carry reinforcing strips or the like 124, the reinforcing strips 124 in this particular instance being made of nylon and all being rigidly attached to the marginal portions of the flaps by stitching (no reference numerals). The marginal portions of the side flaps 108 and 110 and the end flaps 112 and 116 also carry a plurality of grommets 126, each side flap in this instance having ten grommets therein and each end flap having two grommets therein. In addition to the grommets 126, side flap 110 carries a single snap-fastener 128 in the lower marginal portion thereof and side flap 108 carries a pair of snap-fasteners 130 and 132 in both the upper and lower marginal portions thereof. The snap-fasteners 128 and 130 on the lower marginal portions of side flaps 108 and 110 in function are adapted to be received on studs 134 and 136 carried in the marginal portion of end flap 112. Similarly, snap-fastener 132 is adapted to be received on a stud 138 carried in the marginal portion of end flap 114.

Central panel 106 of the pack in this particular instance also carries four loop members or loops 141, 142, 144 and 146. The four loop members are spaced a predetermined distance inwardly from the corners of the central panel 106 and all of them are rigidly connected to the central panel 106 by stitching (no reference numerals). The four loop members 141, 142, 144 and 146 in function serve as connectors or anchoring means for connecting a parachute to the pack 104, as will also be discussed more in detail hereinafter.

As best seen in FIG. 8, the pack 104 is adapted to be connected to the harness 70 and, in this specific embodiment of the invention, is connected to the harness by a plurality of ties or tie members 140. The tie members 140 connect the sides of the pack to the strap members 84 and 86 and, in this specific instance, connect the sides of the pack to the strap members 84 and 86 along seams 116 and 118. It will be noted that six tie members 140 are employed as connectors along each seam 116 and 118 in this particular embodiment of the invention, although only one side of the pack 104 is shown as being connected to the harness 70 in FIG. 8.

The mode of assembling the various components of the aerial delivery device in preparation for being dropped from an aircraft may best be explained and understood by reference to FIGS. 4, 5, 9, 10 and 11. Referring to FIGS. 4 and 5, bag 34 is first placed within harness 70 with the bottom of the bag resting on the bottom of the harness or on the crossed harness straps 84 and 86. The bottom shock absorbing element 50 is then inserted into the bag 34 and placed therein such that it rests on the crossed harness straps 84 and 86 with the outer periphery thereof being snugly engaged by bottom circular harness strap 72. The remaining shock absorbing elements 52 and 54 together with the can 10 and its contents are then placed within the bag 34 and the bag 34 is sealed with the hose clamp 42 and plug 46, as was discussed hereinbefore in connection with the discussion of FIG. 4. The free end of harness strap 84 (FIG. 5) is then inserted into the buckle 96 following which the buckle 96 is tightly drawn over the lid 16 of can 10 to thereby rigidly secure the unit assembly of the can, the shock absorbing elements and the bag within the harness.

Now reviewing FIGS. 5 and 9, the loop 98 carried on the ends of harness strap 86 is then threaded or inserted through the loop 102 formed in the bottom ends 106 of the parachute rigging lines 148. The loop 98 is then stitched to the ends of harness strap 98 by stitches 100 to connect the two loops 98 and 102 and thereby establish a positive connection between the parachute 150 and the harness 70.

A static line 154 of predetermined length is then attached to the apex lines 156 of the parachute 150 by means of a thin string 158, the string 158 in this instance also being made of nylon and being threaded through a loop 160 formed on one end of the static line 154, the loop 160 in this instance being made by reversely folding or bending a portion of the end of the static line 154 and then stitching this reversely folded portion to the adjoining portion of the static line, the stitches in this particular instance being designated by the reference numeral 162. Static line 154 also carries another loop 164 (FIG. 10) which is attached to the static line 154 by stitching 166 and is spaced a predetermined distance from end loop 160. The opposite end of static line 154 is also formed with a loop 168 thereon, and loop 168 is likewise formed in this particular instance by stitching a reversely folded portion of the static line to the adjoining portion of the static line, the stitching being designated in this instance by the reference numeral 170.

Now referring to FIG. 9, the loop 98 on the end of harness strap 86 is then placed or laid over the loop 144 on central panel 106 of the pack 104. The rigging lines 148 of the parachute 150 are then formed into a loop 172 and this loop 172 is then detachably secured to central panel loop 141, the rigging lines loop 172 in this instance being detachably secured to loop 141 by a rubber band or the like 174. Similar loops 176 and 178 are then also formed in the rigging lines 148 and these loops are in turn also detachably secured to central panel loops 142 and 146, respectively, by rubber bands 180 and 182.

Following the attachment of the rigging lines 148 to the central panel 106 of the pack 104, the parachute canopy 184 is then folded into a substantially rectangular-shape and placed upon the pack central panel 106 as shown in FIG. 10. A portion of the parachute static line 154 is then laid upon the parachute canopy 184 with the loop 164 in the static line being positioned at the approximate midpoint of the pack and with the loop 160 on one end of the static line being positioned at the bottom of the pack. The remaining portion of the static line 154 in a folded state is then placed upon the folded parachute canopy 184 (not shown in FIG. 10).

Referring now to FIG. 11, the side and end flaps of the pack 104 are then folded inwardly of the pack central panel 106 to cover the parachute 150 and the static line 154, the static line 154 being covered by pack side flap 108 with the exception of the loop 168 thereon which is pulled out of the pack. When the flaps are folded inwardly of central panel 106, the snap-fasteners 130 and 132 are pressed upon studs 136 and 138 and snap-fastener 128 is pressed upon stud 134 to thereby unite all of the flaps of the pack. Then, a string 186, preferably made of nylon, is threaded or laced through the grommets 126 in both the side and end flaps to more firmly connect the flap members and tightly bind the parachute 150 within the pack 104. It is important to note that the string 186 is also threaded through the loops 160 and 164 on the static line 154 as is shown by the dotted lines in FIG. 11. The complete unit assembly as shown in FIG. 11 is now ready to be loaded aboard an aircraft and placed within a suitable discharge apparatus (not shown) carried by the aircraft with the loop 168 on the end of static line 154 being connected or fixed to the discharge apparatus.

The functioning or operation of the aerial delivery device after being discharged or dropped from an aircraft can best be explained by reference to FIG. 12 wherein there is shown a fragmentary view of an aircraft 188 from which there is trailing the static line 154. Immediately after the complete unit assembly is dropped from the aircraft 188, the static line 154 will be withdrawn from the pack 104. After the complete unit assembly has dropped a predetermined distance, the loops 160 and 164 on the static line 154 will "snap" or break the lacing string 186 on the pack and the static line 154 will then pull or withdraw the parachute 150 from the pack 104. Being withdrawn from the pack 104, the parachute 150 will immediately unfold or "pop open," and an additional load will immediately be imposed upon the static line 154 which additional load will then rupture the string 158 connecting the static line 154 to the apex lines 156 of the parachute. With string 158 ruptured, the aerial delivery device is then free to continue its descent toward the ground (not shown).

Parachute 150 will now slow the descent rate of the can 10 and its contents and will also orientate the can 10 with respect to the ground. Upon striking the ground, the shock absorbing elements 50, 52 and 54 together with the harness 70 and pack 104 will prevent any damage to the can 10 and the roll of film 28 therein. In the event that the can 10 should be subjected to extreme moisture conditions while on the ground or should happen to land in water, the moisture and water-proof bag 34 will prevent any damage to the contents thereof. Once upon the ground, the contents of the can may be easily and quickly removed from the can 10 by merely unbuckling harness strap 84 and removing the hose clamp 42 from the "open" end 40 of bag 34.

Under some conditions of use, it may be desirable to equip the aerial delivery device with a symbol or an identification means to designate or identify the contents of the can 10. One form of identification means which may be employed is shown in FIG. 12 wherein the bottom of the hardness 70 is covered with a color-coded end-cap or cover 190. The end-cap 190 in this particular instance is substantially cylindrical in configuration and is adapted to be snugly received on the bottom circular harness strap 72. If desired, the end-cap 190 may be also rigidly attached to harness strap 72 by stitching (not shown) or by any other suitable means. The end-cap 190 is preferably made of rubberized nylon although it will be appreciated that any other material capable of assuming a variety of colors could be successfully employed.

The aerial delivery device of the present invention has been found to perform satisfactorily when used to deliver destructible items from aircraft flying at either fast or slow speeds and at either high or low altitudes. In fact, tests have demonstrated quite conclusively that the aerial delivery device of the present invention possesses the necessary cushioning or shock absorbing characteristics to effect the safe delivery of destructible articles from fast flying aircraft to pin-point targets on the ground from altitudes of 200 feet or less.

Obviously many modifications and variations of the present invention are possible in the light of the above teachings. It is therefore to be understood that within the scope of the appended claims the invention may be practiced otherwise than as specifically described.

What is claimed is:

1. An aerial delivery device for effecting the safe delivery of destructible articles comprising a container having a closure for receiving said articles, shock absorbing means including a felt top and side wall and a bottom of fibrous shock absorbing material sandwiched between a plurality of metal plates for surrounding said container, a flexible, moisture proof envelope for receiving said container and shock absorbing means, means carried by said envelope for sealing thereof, a harness formed of a plurality of flexible strap members defining an open top pocket for receiving said container and shock absorbing means in said envelope and with strap ends rising above said open top, two of said strap ends being provided for being joined together and forming a closure for said open top and two other strap ends being joined to form a bail on said harness, a pack carried by said harness on an outer side of said pocket, and a parachute carried in said pack and connected to said harness bail.

2. The device of claim 1 wherein said container is a metallic case.

3. The device of claim 1 wherein said harness is comprised of a plurality of substantially circular and substantially axially aligned strap members spaced a predetermined distance apart and held in assembly by a pair of strap members extends substantially longitudinally of said circular strap members, each of said substantially longitudinally extending strap members being connected to each of said substantially circular strap members at diametrically opposed points and each of which extends substantially diametrically of one of said substantially circular strap members to thereby cross each other at substantially right angles.

4. The device of claim 1 wherein said pack is comprised of a substantially rectangular-shaped body portion to which are connected pairs of opposed side flaps and end flaps, said side flap and said end flaps having a plurality of spaced grommets therein along the marginal portions thereof, said side flaps and end flaps being adapted to be folded inwardly of said substantially rectangular-shaped body portion and said grommets being adapted to receive a lace to thereby form a receptacle for said parachute.

References Cited in the file of this patent

UNITED STATES PATENTS

| | | |
|---|---|---|
| 2,314,881 | Helmick | Mar. 30, 1943 |
| 2,314,914 | Wilson et al. | Mar. 30, 1943 |
| 2,327,359 | Manson et al. | Aug. 24, 1943 |
| 2,366,741 | Manson et al. | Jan. 9, 1945 |
| 2,376,330 | Dircksen et al. | May 22, 1945 |
| 2,408,246 | Walter | Sept. 24, 1946 |
| 2,454,616 | Schultz | Nov. 23, 1948 |
| 2,484,853 | Parsons | Oct. 18, 1949 |
| 2,545,248 | Winzen et al. | Mar. 13, 1951 |
| 2,870,871 | Stevinson | Jan. 27, 1959 |